Patented Oct. 30, 1951

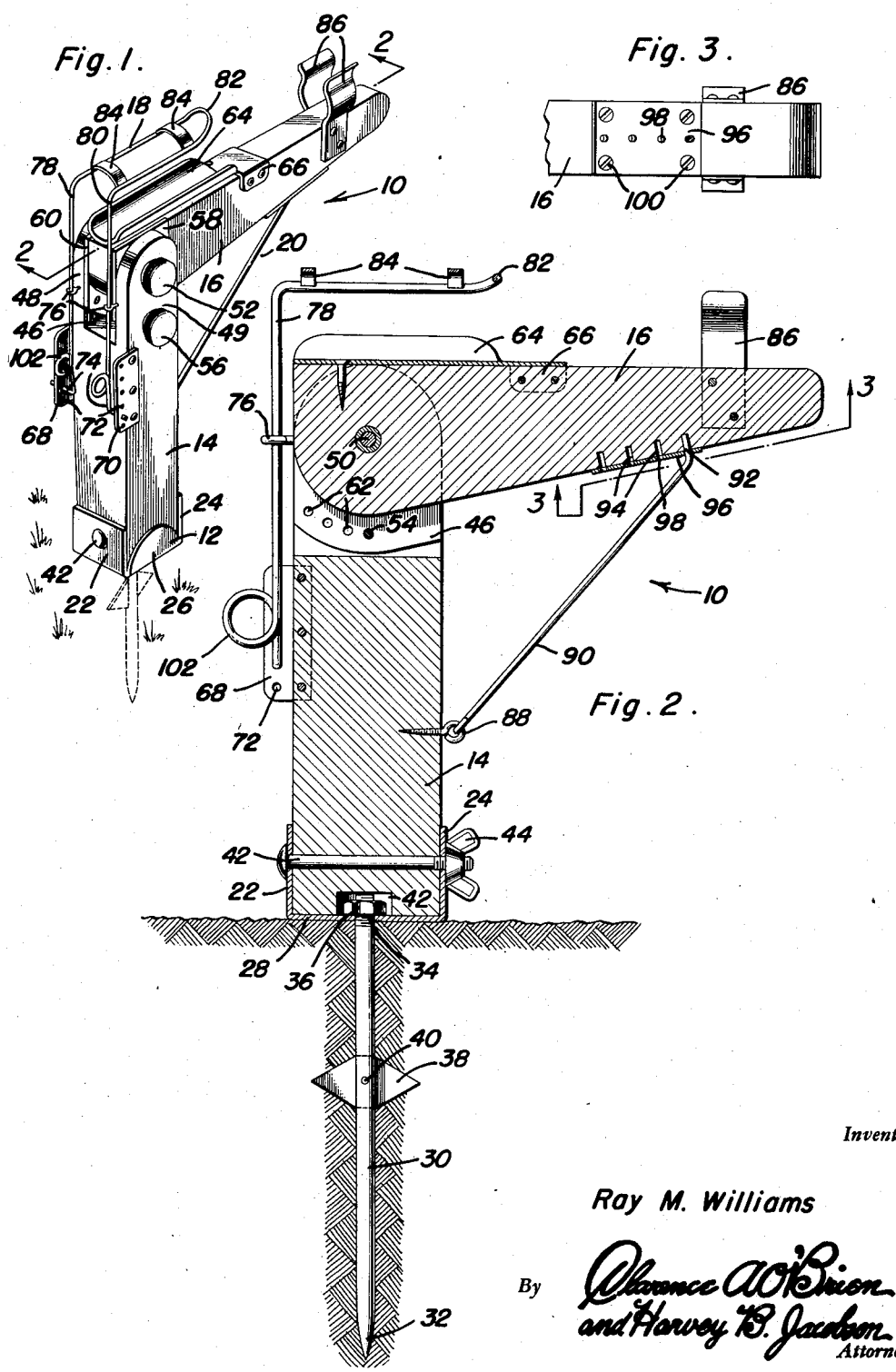

2,573,635

UNITED STATES PATENT OFFICE 2,573,635

FISHING POLE HOLDER

Ray M. Williams, Mexico, Mo.

Application November 25, 1949, Serial No. 129,383

3 Claims. (Cl. 248—42)

This invention relates to fishing pole holders and more particularly to a device adapted to be secured in the ground for retaining a fishing rod in a secure manner.

An object of the present invention is to provide a fishing pole holder which will relieve a fisherman from the strain of holding a fishing rod while engaged in fishing.

Another object of the invention is to provide means for selectively adjusting the angle at which a fishing pole may be held in order to regulate the flexibility of the fishing pole to suit different requirements while fishing for various species of fish.

A yet further object resides in the provision of novel means for detachably securing the fishing pole holder in a substantially rigid manner in the ground.

Still further objects reside in the provision of a fishing pole holder which is strong, durable, highly efficient in operation, simple in construction and manufacture, manufactured of simple and easily obtainable materials, relatively inexpensive, and quite pleasing in appearance.

These, together with the various ancillary objects of the invention will become apparent as the following description proceeds, are attained by this fishing pole holder, a preferred embodiment of which has been illustrated, by way of example only, in the accompanying drawings, wherein:

Figure 1 is a perspective view showing the fishing pole holder in operative emplacement in the ground;

Figure 2 is an enlarged vertical sectional view as taken along line 2—2 in Figure 1, and showing the various elements of the present invention in greatest detail; and, Figure 3 is a sectional detail as taken along line 3—3 in Figure 2.

With continuing reference to the accompanying drawings, wherein like reference numerals designate similar parts throughout the various views, reference numeral 10 is used to generally designate the fishing pole holder which comprises the present invention. The fishing pole holder comprises a socket support 12, a standard 14, an arm 16, a spring retainer 18 and a brace 20, all of which will be henceforth discussed in great detail.

The support 12 comprises a pair of vertically extending flanges 22 and 24 each having an aperture therethrough in alignment with the other, and a pair of oppositely disposed retaining lugs of semi-circular shape designated by reference numerals 26. The flanges 22 and 24 and the lugs 26 are integrally formed with each other and with a base 28 which has an aperture centrally disposed therethrough through which a ground rod 30 extends. The ground rod 30 is pointed at its end 32 and has a threaded portion 34 extending above the base 28 on which a nut 36 is threaded to hold the rod 30 relative to the support 12. The rod 30 is provided with a transversely extending slot in which a diamond shaped member 38 is inserted and held by a set screw such as that indicated at 40. The member 38 is adapted to prevent the rotation of the pin 30 relative to the ground.

The standard 14 is provided with a recess 42 in its base for encompassing the head of the rod 30 and the bolt 36. Additionally, the standard is provided with a transversely extending aperture, adapted to be aligned with the apertures in the flanges 22 and 24. By means of the bolt 42 and wing nut 44 the standard 14 may be rigidly secured to the support 12.

The upper end of the standard 14 is formed with a slot 46 which opens through the upper end and extends transversely through the standard in parallel relation to the bolt 42. The spaced parallel arms 48 and 49 formed on the standard 14 by the slot 46 are provided near their upper ends with aligned openings for reception of a pivot pin 50 which is removably held in place by means of knurled nut 52. Formed in the spaced parallel arms 48 and 49 below the openings through which the pin 50 extends are aligned openings for reception of an adjusting pin 54 which, as illustrated in the drawings, extends transversely of the slot 46 in spaced parallel relationship to the pin 50. The bolt 54 is equipped with a knurled nut 56 so that it may be easily withdrawn from its position in the standard by simply removing the nut 56 from the threaded end thereof.

Pivotally supported on the pivot pin 50 is the arm 16 and a pair of plates 58 and 60 attached to oppositely disposed sides thereof. Each of the plates are provided with spaced openings in alignment with each other. The spaced openings are designated by reference numeral 62. The adjusting pin 54 is adapted to be selectively emplaced in one of the openings 62 in each of the plates.

A tray like container 64 is secured by means of U-shaped member 66 to the arm 16. By means of plates 68 and 70 which are secured to opposite sides of the standard 14, the spring 18 may be adjustably secured to the standard 14. The plates 68 and 70 are provided with a series of apertures 72 therein for selective retention of the horizontal ends 74 of the spring 18. Suitable eyes 76 are secured to the arms 48 and 49 for guidingly engaging the spring 18. By inserting the spring 18 in a selected one of the sets of aligned apertures 72 the fishing pole holder may adjustably retain any size handle of the desired fishing rod. Otherwise, the spring 18 comprises substantially L-shaped legs 78 and 80 one end of each are connected by an arcuate shaped central connecting portion 82. Arcuate braces 84 are also provided for strengthening the spring. Additionally, spring clamps 86 are adapted to form a clamp for engaging the fishing pole at a point remote from the spring 18 in order to detachably support the fishing pole in place on the arm 16.

An eye screw 88 is secured to the standard 14. Pivotally secured to the eye screw 88 is a brace rod 90 which is formed with an angularly disposed upper end 92. A plurality of recesses 94 are provided in the arm 16. A metal plate 96 having apertures 98 in alignment with the apertures 94 is rigidly secured to the arm 16, by means of screws 100. The end 92 of the brace rod 90 is adapted to be selectively engaged within one of the recesses 94 through one of the openings 98. Thusly, when the arm 16 is rotated to a selected position whereby the adjusting pin 54 is selectively engaged within one of the flanges 62, the end 92 is correspondingly engaged in a selected recess 94. Since the tendency of the spring 18 is to push the arm downwardly, this brace rod 90 is exceptionally important since it will prevent such movement.

The device is operated as follows: When the rod 30 is embedded in the ground, and the standard 14 is securely mounted within the support 12, the arm 16 may be pivotally supported at a desired angle relative to the standard by merely emplacing pin 54 through the suitable aligned apertures 62 in the plates 58 and 60. The fishing pole may then be quickly inserted between the spring 18 and the rest 64 with the clamps 86 holding the upper portions of the handle in a rigid manner. Obviously, by pressing together the looped members 102 of the spring the ends 74 may be disengaged from the apertures 72 and thusly, the spring 18 may be raised or lowered so as to position the spring at a desired height above the U-shaped rest 64. Additionally, the loops 102 provide the spring with its resilient effect.

From the foregoing, the construction and advantages of this fishing pole holder are readily apparent, therefore, further description is believed to be unnecessary. Furthermore, by reference to Patent No. 2,481,272, on which this invention is an improvement, the uses and functions of the device may perhaps be more thoroughly understood.

However, since numerous modifications will readily occur to those skilled in the art after a consideration of the foregoing specification and accompanying drawings, it is not intended to limit the invention to the precise embodiment shown and described, but all suitable modifications and equivalents may be resorted to which fall within the scope of the appended claims.

Having described the invention, what is claimed as new is:

1. A fishing pole holder comprising means for securing said holder in the ground, a standard detachably secured in said means, said standard having an elongated longitudinal slot entering the end remote from said means, a pivot pin carried by said standard and extending transversely through said slot, an arm mounted in said slot on said pivot pin to swing in a vertical arc about the axis of said pin, a plate secured to a side of said arm having a plurality of apertures therethrough, a pin carried by said standard and extending through the slot in parallel relation to the pivot pin for selective engagement within said apertures of said plate to hold said arm in various predetermined angular positions, horizontal spring means secured to said standard for securely retaining the handle of a fishing rod between said arm and said spring means, and bracing means terminally connected to said standard and said arm when said arm is in any of the various predetermined angular positions.

2. A fishing pole holder comprising means for securing said holder in the ground, a standard detachably secured in said means, said standard having an elongated longitudinal slot entering the end remote from said means, a pivot pin carried by said standard and extending transversely through said slot, an arm mounted in said slot on said pivot pin to swing in a vertical arc about the axis of said pin, a plate secured to a side of said arm having a plurality of apertures therethrough, a pin carried by said standard and extending through the slot in parallel relation to the pivot pin for selective engagement within said apertures of said plate to hold said arm in various predetermined angular positions, a horizontal spring having L-shaped legs connected at one end to each other by an arcuate central portion, the free ends of said legs being secured to said standard, the arcuate central portion of said spring overlying said arm for securely retaining the handle of a fishing rod, a plurality of spaced recesses in said arm, another plate having a plurality of apertures therethrough secured to said arm with said apertures in said another plate in alignment with said recesses, a brace rod pivotally connected at one end to said standard, the other end of said brace rod selectively engaging said arm within one of said recesses.

3. A fishing pole holder comprising means for securing said holder in the ground, a standard detachably secured in said means, said standard having an elongated longitudinal slot entering the end remote from said means, a pivot pin carried by said standard and extending transversely through said slot, an arm mounted in said slot on said pivot pin to swing in a vertical arc about the axis of said pin, a plate secured to a side of said arm having a plurality of apertures therethrough, a pin carried by said standard and extending through the slot in parallel relation to the pivot pin for selective engagement within said apertures of said plate to hold said arm in various predetermined angular positions, a horizontal spring having L-shaped legs connected at one end to each other by an arcuate central portion, a pair of oppositely disposed members secured to said standard a series of spaced apertures in each of said members, the free ends of said legs being adjustably secured in engagement with said members in selected apertures in said members to adjust the distance between the arcuate central portion of said spring and said arm, the arcuate central portion of said spring overlying said arm for securely retaining the handle of a fishing rod, a plurality of spaced recesses in said arm, another plate having a plurality of apertures therethrough secured to said arm with said apertures in said another plate in alignment with said recesses, a brace rod pivotally connected at one end to said standard, the other end of said brace rod selectively engaging said arm within one of said recesses.

RAY M. WILLIAMS.

REFERENCES CITED

The following references are of record in the file of this patent:

UNITED STATES PATENTS

| Number | Name | Date |
| --- | --- | --- |
| 1,534,642 | Hoagland | Apr. 21, 1925 |
| 2,289,592 | Riedi | July 14, 1942 |
| 2,309,350 | Nanasko | Jan. 26, 1943 |
| 2,481,272 | Williams | Sept. 6, 1949 |